H. S. LEWIS.
APPARATUS FOR RENDERING, REFINING, AND COOLING LARD, ETC.
No. 32,633. Patented June 25, 1861.
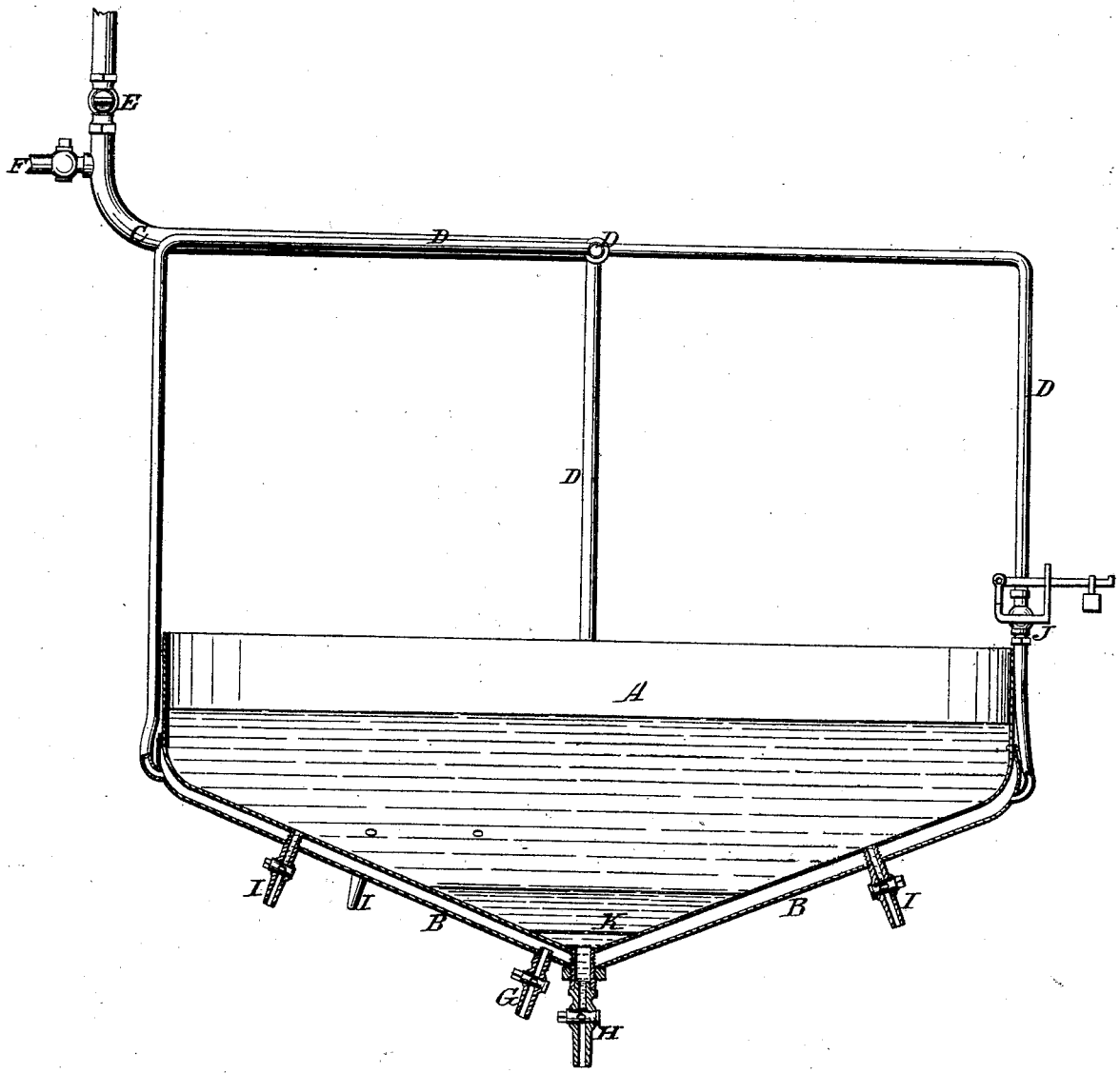
Witnesses.
D. R. Fraser.
Chas H. Barnum
Inventor.
H. S. Lewis.

UNITED STATES PATENT OFFICE.

H. S. LEWIS, OF CHICAGO, ILLINOIS.

PROCESS FOR REFINING LARD.

Specification of Letters Patent No. 32,633, dated June 25, 1861.

*To all whom it may concern:*

Be it known that I, H. S. LEWIS, of Chicago, in the county of Cook and State of Illinois, have invented a new and Improved Process for Refining and Cooling Lard and Tallow; and I do hereby declare that the following is a full, clear, and exact description of the same, reference being had to the accompanying drawing, forming part of this specification, said drawing representing a vertical section of the apparatus.

The apparatus for carrying out my improved process consists in a pan with a double bottom of inverted conical form or of other form having a downward inclination from the sides to the center and having a convenient arrangement of pipes and cocks for admitting steam or cold water into the double bottom to heat or cool the contents, and of cocks for drawing off the lard or tallow and the water extracted therefrom.

The apparatus is more especially adapted for the refining of steam rendered lard or tallow which until refined always contains more or less water which is a source of rapid decomposition.

To enable others to make and use my invention I will proceed to describe its construction and operation.

A is the pan of circular or polygonal form.

B, is the double bottom of inverted conical or pyramidal form according to the shape of the pan, constituting a heater or cooler according as it is filled with steam or cold water.

C, is the main steam and water pipe with branches D, D, connecting it with the upper part of the space within the double bottom at several points.

E, is a cock for the admisssion of steam to the said pipe C; and F, a cock for the admission of water to the said pipe.

G, is a cock near the lowest part of the bottom for the escape of steam or water from the space therein.

H, is a large cock at the lowest part of the bottom for letting out water or impurities from the pan.

I, I, are cocks at a higher elevation for drawing off the lard or tallow.

J, is a safety valve connected with the space within the bottom.

K, is a strainer placed across the lowest part of the bottom.

To refine the lard or tallow it is drawn from the steam rendering tank into the pan A, the cocks I, I, and H being closed. When the stock is sufficiently settled as much as possible of the water and other foreign matters is drawn off through the cock H. The cock H, is then closed and steam introduced within the double bottom B, in order to evaporate the remainder of the moisture and permit such foreign matter as cannot be converted into vapor to subside to the bottom of the pan, after which the steam is shut off by closing the cock E, and cold water is let into the double bottom by opening the cock F, the cock G, being also opened to permit its escape and thus produce a constant circulation of cold water through the bottom to cool the contents of the pan; and when this is effected, the cock H is opened to draw off the water. The cock H, is afterward closed, and the water thus shut off, and all allowed to escape from the interior of the bottom by the cock G, and steam is turned on again to heat the contents of the pan again and drive off any remaining water by converting it into steam. The contents are then drawn off by the cocks I, I.

I am aware the pans for rendering and melting lard and tallow have previously been used with bottoms inclining downward to the center and made double for the introduction of steam and I do not therefore desire to be understood as claiming such a device broadly. The superiority of my invention over those previously in use consists in the provision for introducing the hot steam and the cold water at the extreme upper part of the chamber, by which means the upper stratum of the lard or tallow is most perfectly purified. In heating the stock the inflowing steam, by heating the upper stratum most highly and thereby rarefying it causes the impurities to descend therefrom and again in cooling the cold water acts to congeal first the upper and outer portions of the stock, driving foreign matters downward and toward the center and causing them to collect at the bottom of the pan below the cocks I.

What I claim as my invention and desire to secure by Letters Patent is,

The process of refining lard or tallow from above downward by the successive application of steam and cold water applied and operating in the manner and for the purposes herein shown and explained.

H. S. LEWIS.

Witnesses:
D. R. FRASER,
CHAS. H. BARMM.